United States Patent [19]

Dehm et al.

[11] Patent Number: 4,797,450

[45] Date of Patent: Jan. 10, 1989

[54] ADDITIVES FOR WATER-BASE DRILLING FLUID AND PROCESS

[75] Inventors: David C. Dehm, Thornton; H. Franklin Lawson, Downingtown, both of Pa.

[73] Assignee: Arco Chemical Company, Newtown Square, Pa.

[21] Appl. No.: 854,959

[22] Filed: Jun. 13, 1986

Related U.S. Application Data

[63] Continuation of Ser. No. 547,304, Oct. 31, 1983, abandoned.

[51] Int. Cl.$^4$ .................................................. C08F 8/36
[52] U.S. Cl. ............................. 525/326.7; 525/327.5; 525/327.6; 525/344
[58] Field of Search ................ 525/326.7, 327.5, 327.6

[56] References Cited

U.S. PATENT DOCUMENTS

| | | | |
|---|---|---|---|
| 2,650,905 | 9/1953 | Fordyce et al. | 252/8.5 |
| 2,718,497 | 9/1955 | Oldham et al. | 252/8.5 |
| 3,332,872 | 7/1967 | Oakes | 252/8.5 |
| 3,615,531 | 10/1971 | Meyer et al. | 252/8.5 |
| 3,730,900 | 5/1973 | Perrconi et al. | 252/8.5 |
| 4,284,518 | 8/1981 | Chen et al. | 252/8.55 |
| 4,317,893 | 3/1982 | Chen et al. | 525/328.1 |
| 4,478,727 | 10/1984 | Turner et al. | 525/327.5 |
| 4,581,147 | 4/1986 | Branch, III | 526/287 |

*Primary Examiner*—Joseph L. Schofer
*Assistant Examiner*—Bernard Lipman
*Attorney, Agent, or Firm*—Dennis M. Kozak

[57] ABSTRACT

An additive for water-base drilling fluid compositions used for drilling subterranean wells is disclosed. In one embodiment, the additive is a sulfonated copolymer of recurring units of a maleimide monomer and recurring units of a vinyl monomer. In another embodiment, the additive is a sulfonated terpolymer of recurring units of a maleimide monomer, recurring units of a vinyl monomer, and recurring units of a carboxyl-containing monomer. Water-base drilling fluids compositions which contain the additive and a process for drilling subterranean wells therewith are also disclosed.

2 Claims, No Drawings

ADDITIVES FOR WATER-BASE DRILLING FLUID AND PROCESS

This is a continuation of application Ser. No. 547,304, filed 10/31/83, now abandoned.

This invention relates to drilling fluids.

More specifically, this invention relates to water-base drilling fluid compositions used for drilling subterranean wells, typically oil and gas wells.

In one of its more specific aspects, this invention pertains to an additive for water-base drilling fluids and to a process for drilling subterranean wells using water-base drilling fluids which contain the additive of this invention.

Drilling fluids are generally classified on the basis of their principal component. When the principal ingredient is a liquid (water or oil) the term "mud" is applied to a suspension of solids in the liquid. Water is the principal component of most drilling fluids and, accordingly, water-base drilling fluids or "water muds" are by far the most common.

Water-base drilling fluids vary widely in composition and properties and many have been classified based on their principal ingredients. Common classifications of water-base drilling fluids are: fresh water, salt water, low solid muds, spud muds, salt water muds, lime muds, gyp mud and CL-CLS muds.

In addition to water, these drilling fluids can comprise any number of known additives which perform various functions in the drilling fluid system. Among the most common additives are materials which increase density such as barite and galena and viscosifiers or thickening agents such as clays (usually bentonite) and asbestos.

Furthermore, many of the water-base drilling fluids are formulated to contain one or more polymeric additives which serve to reduce filtration, stabilize clays, flocculate drilled solids, increase carrying capacity, emulsify, lubricate and the like. Among the most commonly employed polymeric additives are: starches, guar gum, xanthan gum, sodium carboxy-methylcellulose (CMC), hydroxyethylcellulose (HEC), and synthetic water dispersable polymers such as acrylics and alkylene-oxide polymers.

Also well known and important for their ability to reduce flow resistance and gel development in clay-water muds are materials which are broadly referred to in the drilling fluid industry as "thinners".

Materials conventionally used as thinners are classified as plant tannins, polyphosphates, lignitic materials and lignosulphates.

However, experience has shown that many of the materials which function as conventional thinners also have been found to perform other important functions, frequently of greater significance than improving the flow properties of the mud. Specifically, some have been found effective to reduce filtration and cake thickness, to counteract the effects of salts, to minimize the effect of water on the formations drilled, to emulsify oil in water, and to stabilize mud properties at elevated temperatures. Thus, the term "mud-conditioning agent" is often more appropriate than thinner and as used herein is understood to mean an additive which functions as a conventional thinner and also serves to stabilize mud properties at elevated temperatures.

Additionally, any number of known detergents, lubricants, corrosion inhibitors, materials for control of loss of circulation, surfactants and the like can be incorporated into water-base drilling fluid compositions.

Water-base drilling fluid compositions and additives to impart specific properties thereto are described in detail in Chapters 1,2, and 11, of *Composition and Properties of Oil Well Drilling Fluids*, Fourth Edition, George R. Gray and H. C. H. Darley, Gulf Publishing Company.

Numerous additives which have been found to be effective to enhance the properties of water-base drilling fluids are taught in the patent literature. The following patents are representative.

U.S. Pat. No. 2,650,905 teaches the use of a sulfonated polystyrene in a water-based drilling fluid decreases the loss of fluid from the mud to the surrounding formation.

U.S. Pat. No. 2,718,497 teaches a drilling fluid containing a linear hydrocarbon chain polymer or copolymer of relatively high molecular weight, in which hydrophilic acid or acid forming groups are present, provides good fluid loss control.

U.S. Pat. No. 3,332,872 teaches that the use of a small amount of a copolymer of styrene and maleic anhydride in a drilling fluid provides effective thinning capability and viscosity control.

U.S. Pat. No. 3,730,900 teaches that a water mud containing a low molecular weight copolymer of styrene and maleic anhydride; exhibits a good thermal stability and the ability to handle formation contamination while maintaining an acceptable mud rheology.

U.S. Pat. No. 4,268,400 teaches the reduction of filtrate from a drilling fluid by the utilization of a terpolymer of a monovalent alkali metal salt of acrylic acid, a hydroxy alkyl and acrylamide.

Additional additives and drilling fluid compositions are described in U.S. Pat. Nos. 3,125,517; 3,214,374; 3,236,769; 3,686,119; 3,709,819; 4,064,055; 4,230,586; 4,268,400; and 4,293,427.

The teachings of the above referred to prior art are incorporated herein by reference thereto.

One of the major problems encountered in attempts made to design an "ideal" drilling mud, is the problem of formulating a mud which is effective in numerous different rock strata formations and over the broad viscosity, temperature and pressure ranges encountered while drilling a borehole in the earth.

It is known, for example, that the addition of polyphosphates or phosphate-containing materials to water-clay muds will serve to defloculate colloidal clay and drilled solids. However, these materials have been found to be ineffective at temperatures above 150° to 200° F.

Tannin compounds, particularly quebracho extract, impart more temperature-stability and more contamination resistance than do the polyphosphates, but quickly lose their effectiveness at temperatures above about 200° F.

In an attempt to increase the thermal stability of water-base muds, ferrochome and chrome lignosulfonate treated muds were developed. For years the ferrochome and chrome lignosulfonates treated muds have been the principal materials employed in water-base muds used for drilling high temperature wells. These muds are not completely satisfactory in that they have been found to exhibit drastically reduced effectiveness when subjected to the combination of elevated temperature (>300° F.) and/or the presence of certain formation contaminants such as carbon dioxide.

There is little doubt that the combination of high temperature (>300° F.) and formation contaminants (high solids, salts, calcium, $CO_2$ and the like) can lead to serious drilling problems. This combination of conditions results in lost circulation as well as excessive gel strengths. Under these conditions the thinners are rapidly depleted and must be added continuously to maintain the proper mud fluidity. Lost rig time and costly mud bills result.

Thus, there is a long felt need in the drilling fluid industry for a material which displays dispersant (thinning) activity at elevated temperatures in the presence of formation contaminants.

The present invention provides a material or additive which is particularly suitable for use as a mud-conditioning agent for water-base drilling fluids. Water soluble salts of the additive of this invention, when added to water-base drilling fluids, have been found to be particularly effective in thinning muds at temperatures exceeding 375° F. in the presence of formation contaminants such as formation solids, salts, various forms of calcium and carbon dioxide.

According to this invention, there is provided a water-base drilling fluid composition which contains a sulfonated polymer of recurring units of a maleimide monomer, recurring units of a vinyl monomer and, optionally, recurring units of a carboxyl-containing monomer.

According to this invention, there is also provided a method for drilling a well which comprises circulating in the well while drilling a water-base drilling fluid composition which contains a sulfonated polymer of recurring units of a maleimide monomer, recurring units of a vinyl monomer and, optionally, recurring units of a carboxyl-containing monomer.

In a preferred embodiment of this invention, the polymer is a sulfonated styrene/N-phenylmaleimide copolymer.

In another preferred embodiment, the polymer is a sulfonated styrene/N-phenylmaleimide/maleic anhydride terpolymer.

Any suitable maleimide monomer can be used to produce the additive of this invention.

Particularly suitable maleimide monomers are represented by the general formula:

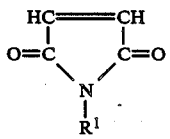

wherein $R^1$ represents: hydrogen; an alkyl group; a halogen, nitrogen, oxygen, sulfur or phosphorus substituted alkyl group; a cycloalkyl group; a halogen, nitrogen, oxygen, sulfur, phosphorus or carbon substituted cycloalkyl group; a non-aromatic heterocyclic group containing nitrogen, sulfur or phosphorus; an aryl group; a halogen, nitrogen, oxygen, sulfur, phosphorus or carbon-substituted aryl group; or, an aromatic heterocylic group containing nitrogen, sulfur or phosphorus.

Examples of maleimide monomers which may be used in the preparation of the additive of this invention are: maleimide, N-phenylmaleimide, N-ethylmaleimide, N-(2-chloropropyl)maleimide, N-cyclohexylmaleimide, N-pyrrole-maleimide, 4-diphenylmaleimide, 1-naphthylmaleimide, 2,6-diethylphenylmaleimide, 2-,3-, and 4-chlorophenylmaleimide, 4-bromophenylmaleimide, 2,4,6-trichlorophenyl maleimide, 2,4,6-tribromophenylmaleimide, 4-n-butylphenyl maleimide, 2-methyl-4-n-butylphenylmaleimide, 4-benzylphenylmaleimide, 2-, 3- and 4-methylphenyl maleimide, 2-methoxy-5-chlorophenyl maleimide, 2-methoxy-5-bromophenyl maleimide, 2,5-dimethoxy-4-chlorophenyl maleimide, 2-, 3- and 4-ethoxyphenyl maleimide, 2,5-diethoxyphenyl maleimide, 4-phenoxyphenyl maleimide, 4-methoxy-carbonylphenyl maleimide, 4-cyanophenyl maleimide, 2-, 3- and 4-nitrophenyl maleimide, and the like, and their mixtures. The N-aryl- and substituted aryl maleimide monomers are preferred.

Any vinyl monomer which will compolymerize with the maleimide monomer is suitable for use in the practice of this invention.

Particularly suitable vinyl monomers are represented by the general formula:

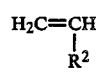

wherein $R^2$ represents: an alkyl group, a cycloaliphatic group, an aromatic group, an alkyl substituted aromatic group, an aryl substituted aromatic group, a condensed aromatic group and an alkyl or aryl substituted condensed aromatic group.

Examples of vinyl monomers which may be used in the preparation of additives of this invention are: styrene, alpha methylstyrene, para methylstyrene, nuclear methylstyrenes, ethylstyrene, isopropylstyrene, tert-butylstyrene, chlorostyrenes, dichlorostyrenes, vinylnaphthalene, indene, methylindenes, styrenes which contain sulfo groups, e.g. p-styrene sulfonic acid, ethylene, propylene, butylene, isoprene, vinyl acetate and its hydrolized form-vinyl alcohol in the polymeric material, vinyl propionate, vinyl butylate, vinyl isobutyl ether and the like, and their mixtures.

Preferred vinyl monomers for use in the practice of this invention are the vinyl aromatic monomers. Particularly suitable vinyl aromatic monomers are styrene, alpha methylstyrene, para methylstyrene, nuclear methylstyrenes, ethylstyrene, isopropylstyrene, tert-butylstyrene, vinylnaphthalene and the like and their mixtures.

Before discussing the carboxyl-containing monomers, which optionally may be employed to produce the terpolymer additives of this invention, it may be helpful to first discuss the methods for the preparation of the additives.

The copolymer or terpolymer additives agents of this invention can be prepared by any suitable polymerization technique known to those skilled in the art.

A particularly suitable polymerization technique for the formation of either a copolymer or terpolymer of recurring units of the selected maleimide monomer, vinyl monomer and, optionally, carboxyl-containing monomer is conventional free radical polymerization in solution, in bulk or by suspension.

Alternatively, the polymerization of a vinyl monomer with a cyclic anhydride, followed by imidization of the cyclic anhydride units to their imide dervatives by reaction with anamine is also suitable. This polymerization/imidization route and usable monomers are well known and is described in U.S. Pat. No. 3,840,499, the teachings of which are incorporated herein by reference. The polymers produced using this method are theoretically completely imidized and, thus, are copolymers. In principal, however, the copolymers may still contain recurring units of acid, anhydride or the half amide.

Copolymers of styrene and maleic anhydride have been found particularly suitable for use with this alternative polymerization/imidization route and are commercially available. Suitable styrene/maleic anhydride copolymers are available from ARCO Chemical Company, division of Atlantic Richfield Company under the designation SMA ® Resins. Particularly suitable for use are SMA 1000, SMA 2000, and SMA 3000.

SMA 1000 has a styrene to maleic anhydride ratio of 1/1 and a number average molecular weight as determined by vapor phase osmometry of 1600.

SMA 2000 has a styrene to maleic anhydride ratio of 2/1 and a number average molecular weight as determined by vapor phase osmometry of 1700.

SMA 3000 has a styrene to maleic anhydride ratio of 3/1 and a number average molecular weight as determined by vapor phase osmometry of 1900.

Optionally, if a terpolymer is desired, any carboxyl-containing monomer which is polymerizable with the vinyl and maleimide monomers is suitable for use. Alternatively, as described above, a minor amount of carboxyl-containing monomer may be present if the polymerization/imidization technique is used due to incomplete imidization.

Particularly suitable carboxyl-containing monomers are represented by the general formula:

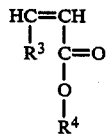

wherein $R^3$ represents hydrogen; an alkyl group; an aryl group; or

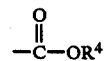

and $R^4$ represents hydrogen; an alkyl group of an aryl group.

Examples of carboxyl-containing monomers which may be used in the preparation of the additives of this invention are: acrylates, methacrylates and their amides, esters, anhydrides and salts; maleic anhydride or maleic acid and its esters, amides and salts and the like, and their mixtures.

The co- or terpolymers must be sulfonated in order to be suitable for use in water-base drilling fluids. Accordingly, at least one of the monomers selected to produce the co- or terpolymer must possess an aromatic site suitable for the succeeding sulfonation reaction.

Sulfonation of the polymers may be achieved using any conventional sulfonation method and is carried out in any solvent inert to the sulfonating agent whose solvency is high enough to dissolve the polymer. Conventional sulfonating agents include chlorosulfonic acid, liquid sulfur trioxide, sulfuric acid and the like. The sulfonic acid groups on the polymers will typically be present in neutralized form as alkali metal salts, particularly as sodium or potassium salts. The amount of or degree of sulfonation of the polymeric additives of this invention is critical only to the extent that the polymers must be sulfonated to a degree effective to make them at least partially soluble in the water-base drilling fluid composition.

Although the polymers must be sulfonated, it may not be necessary under certain conditions to undergo a separate sulfonation step. For example, if a sulfonated monomer such as styrene sulfonic acid or a sulfonated maleimide monomer is selected, polymerization will result in a sulfonated polymer and thus the need to undergo a separate sulfonation step can be eliminated. Also, if a sulfonated styrene/maleic anhydride copolymer, such as SSMA-1000, commercially available from ARCO Chemical Company, division of Atlantic Richfield Company, is employed with the imidization technique described above, the separate sulfonation step can be eliminated in that the resulting imidization product is a sulfonated styrene/N-phenylmaleimide copolymer.

SSMA-1000 has a styrene to maleic anhydride ratio of 1/1 and a number average molecular weight of 1600 as determined by vapor phase osmometry.

Examples of a few additives of this invention are: copolymer, sulfonated styrene/N-phenylmaleimide copolymer, sulfonated styrene/maleic anhydride/N-phenylmaleimide terpolymer sulfonated styrene/maleanilic acid/maleimide terpolymer, sulfonated styrene/maleimide, sulfonated styrene/maleic anhydride/maleimide terpolymer, sulfonated styrene/acrylate/maleimide terpolymer, sulfonated styrene/acrylamide/maleimide terpolymer, sulfonated vinyl napthalene/maleimide copolymer, sulfonated indene/maleimide copolymer, sulfonated indene/maleic anhydride/maleimide terpolymer, sulfonated indene/N-phenylmaleimide copolymer, sulfonated indene/maleic anhydride/N-phenylmaleimide terpolymer, sulfonated indene/acrylate/maleimide terpolymer, sulfonated α-methyl styrene/sodium acrylate/N-phenylmaleimide terpolymer, sulfonated p-methylstyrene/sodium methacrylate/N-phenylmaleimide terpolymer, p-styrene sulfonic acid-N-phenylmaleimide copolymer, and the like, and their mixtures.

Polymers prepared according to the polymerization or polymerization/imidization techniques described above are suitable for use as additives of this invention over a wide molecular weight range. The co- or terpolymers, or water soluble salts thereof before sulfonation will have a number average molecular weight as determined by vapor phase osmometry within the range of from about 1,000 to about 50,000. Preferably, the polymers will have a molecular weight of less than 15,000 and, most preferably, less than 5,000.

Moreover, polymers prepared according to the polymerization or polymerization/imidization techniques can be composed of their recurring monomer units within wide mole percent ranges. Preferably, in its copolymer form, the additive will contain in mole percent from about 75 to about 25 recurring units of vinyl monomer and from about 25 to about 75 recurring units of maleimide monomer.

In its terpolymer form, the additive will contain in mole percent from about 25 to about 75 recurring units of vinyl monomer, from about 5 to about 74 recurring units of malemide monomer and from about 1 to about 70 recurring units of carboxyl-containing monomer.

The additive of this invention may be added to any of a number of conventional water-base drilling fluid compositions which may contain a variety of the previously described commonly utilized other additives such as bentonite, barite, lignite, lignosulfonates, starch, quebracho, carboxymethylcellulose and the like.

Moreover, the additive may be incorporated in the drilling fluid using any conventional method of incorporation. For example, it may be added to the drilling fluid as a pretreatment or it may be added in predetermined quantities to the drilling fluid and thereafter the drilling fluid is circulated in the borehole.

The amount of additive added to the drilling fluid will vary depending on the particular drilling environment. Typically, about 1 to about 5 pounds of additive per 42 gallon barrel (PPB) of drilling fluid is sufficient preferably from about 1 to about 3 PPB. However, it is possible, under some circumstances, to utilize an amount as low as ½ PPB or less, or as high as 10 PPB or more.

Although, in its preferred embodiment, the sulfonated co- or terpolymer additives serve as mud-conditioning agents for water base drilling fluids, their dispersant and thermal stability properties make them suitable for other end use applications. These include use in the water treatement industry for the control, reduction and/or prevention of scale and sludge deposits e.g. calcium phosphate, in cooling water, scrubber and steam generating systems, evaporators, economizers and the like.

Accordingly, within the scope of this invention, a method is provided for controlling the formation and deposition of materials on the structual parts of a system containing an aqueous medium, which in turn contains ions which would otherwise form and deposit as the materials. The method involves introducing into the aqueous medium an effective amount for the purpose of controlling the formation and deposition of materials on the structural parts of said system of a sulfonated copolymer of recurring units of a vinyl monomer and recurring units of a maleimide monomer or a sulfonated terpolymer which also contains recurring units of a carboxyl-containing monomer.

Relative to the use of the sulfonated polymers of this invention in water treatment applications, the teaching of U.S. Pat. No. 4,288,327 which pertains to the use of sulfonated styrene/maleic anhydride copolymers for the control of the formation and deposition of scale and sludge materials in aqueous mediums is incorporated herein by reference thereto. Other end use applications for which the sulfonated co- and terpolymers of this invention are suitable include: cement and mortar applications, agricultural formulations, fertilizers, magnetic tape, dyes, paints, lubricants, coal slurries, printing inks, grinding aids, ore flotation, lime-soap, clay processing and the like.

Having described the materials and methods of this invention, reference is now made to the following examples which serve to demonstrate the invention.

EXAMPLE I

This example demonstrates the preparation of a sulfonated styrene/N-phenyl maleimide copolymer additive the imidization technique.

About 40 parts by weight of a styrene/maleic anhydride copolymer (SMA ® 1000) were suspended in about 476 parts by weight xylene.

The resulting slurry was heated to about 110° C. and treated with about 20.4 parts by weight of aniline.

The treated slurry was heated to the solvent reflux temperature and held there for about 4 hours under a blanket of dry nitrogen.

Next, the slurry was filtered and the filter cake washed with hexane before being dissolved in tetrahydrofuran (THF).

The resulting copolymer styrene/N-phenylmaleimide, was recovered from the THF solution by the addition of an excess of hexane. The copolymer was found to have a melting point of 230° C.

Next, a solution of about 30 parts by weight of the recovered copolymer in 60 parts by weight dichloroethane was prepared.

The copolymer containing solution was then added to a solution of about 17.6 parts by weight $SO_3$ in 264 parts by weight dichloroethane at a rate which allowed moderate evolution of heat.

The resulting solution was heated to about 65° C., held at that temperature for about 1 hour and then cooled to about 45° C.

About 170 parts by weight of a 10% weight percent aqueous NaOH solution were added and the mixture reheated to about 65° C. and held for about about 1 hour.

The organic and aqueous phases of the mixture were then separated and the aqueous phase was dried and the product was recovered as a sodium salt of a sulfonated styrene/N-phenylmaleimide copolymer additive suitable for use as a mud-conditioning agent. The copolymer contained 10.0 weight percent sulfur based on total weight of the solids.

EXAMPLE II

This example demonstrates the preparation of a sulfonated styrene/N-phenyl maleimide copolymer additive of this invention using the imidization technique.

About 40 parts by weight of a styrene/maleic anhydride copolymer (SMA ® 2000) were suspended in about 476 parts by weight xylene.

The resulting slurry was heated to about 110° C. and treated with about 11.6 parts by weight of aniline.

The treated slurry was heated to the solvent reflux temperature and held there for about 4 hours under a blanket of dry nitrogen.

Next, the slurry was filtered and the filter cake was washed with hexane before being dissolved in THF.

The resulting copolymer, styrene/N-phenylmaleimide, was recovered from the THF solution by the addition of an excess of hexane.

Next, a solution of about 20 parts by weight of the recovered copolymer in 60 parts by weight dichloroethane was prepared.

The copolymer containing solution was then added to a solution of about 12.4 parts by weight $SO_3$ in 264 parts by weight dichloroethane at a rate which allowed moderate evolution of heat.

The resulting solution was heated to about 65° C., held at that temperature for about 1 hour and then cooled to about 45° C.

About 100 parts by weight of a 10% weight percent aqueous NaOH solution were added and the mixture reheated to about 65° C. and held for about about 1 hour.

The organic and aqueous phases of the mixture were then separated and the aqueous phase was dried and the product was recovered as a sodium salt of a sulfonated styrene/N-phenylmaleimide copolymer suitable for use as a mud-conditioning agent of this invention. The copolymer contained 11.0 weight percent sulfur based on total weight of the solids.

EXAMPLE III

This example demonstrates the preparation of a sulfonated styrene/N-phenyl maleimide copolymer additive of this invention using the imidization technique.

About 40 parts by weight of a styrene/maleic anhydride copolymer (SMA ® 3000) were suspended in about 476 parts by weight xylene.

The resulting slurry was heated to about 110° C. and treated with about 9.1 parts by weight of aniline.

The treated slurry was heated to the solvent reflux temperature and held there for about 4 hours under a blanket of dry nitrogen.

Next, the slurry was filtered and the filter cake washed with hexane before being dissolved in THF.

The resulting copolymer, styrene/N-phenylmaleimide, was recovered from the THF solution by the addition of an excess of hexane.

Next, a solution of about 20 parts by weight of the recovered copolymer in 60 parts by weight dichloroethane was prepared.

The copolymer containing solution was then added to a solution of about 12.9 parts by weight $SO_3$ in 264 parts by weight dichloroethane at a rate which allowed moderate evolution of heat.

The resulting solution was heated to about 65° C., held at that temperature for about 1 hour and then cooled to about 45° C.

Next about 100 parts by weight of a 10 weight percent aqueous NaOH solution were added and the mixture reheated to about 65° C. and held for about about 1 hour.

The organic and aqueous phases of the mixture were then separated and the aqueous phase was dried and the product was recovered as a sodium salt of a sulfonated styrene/N-phenylmaleimide copolymer additive suitable for use as a mud-conditioning agent. The copolymer contained 12.0 weight percent sulfur based on total weight of the solids.

EXAMPLE IV

This example demonstrates the preparation of a sulfonated styrene/N-phenyl maleimide copolymer additive using the polymerization technique.

About 40 parts by weight of styrene monomer and 66.2 parts by weight of N-phenylmaleimide monomer (prepared from maleic anhydride and aniline using the procedure found on page 944, Collective Volume VI, *Organic Syntheses*, the teachings of which are incorporated herein by reference thereto) were dissolved in about 2020 parts by weight of toluene.

The resulting solution was charged to a resin kettle and sparged with a stream of dry nitrogen for about 30 minutes.

Next about 5.8 parts of benzoyl peroxide (initiator) and 2.9 parts of mercaptoacetic acid (chain transfer agent) were added to the contents of the resin kettle.

The temperature of the contents of the resin kettle was increased to 75° C. and held there for about 1.6 hours.

The resulting copolymer, a styrene/N-phenyl-maleimide copolymer, was recovered by filtration, tested and found to have a number average molecular weight of 6,800 as measured by GPC using polystyrene standards.

Next, a solution of about 20 parts by weight of the recovered copolymer in 80 parts by weight dichloroethane was prepared.

The copolymer-containing solution was then added to a solution of about 9.8 parts by weight $SO_3$ in 377 parts by weight dichloroethane at a rate which allowed moderate evolution of heat.

The resulting solution was heated to about 65° C., held at that temperature for about 1 hour and then cooled to about 45° C.

About 78.5 parts by weight of a 10 weight percent aqueous NaOH solution were added and the mixture reheated to about 65° C. and held for about about 1 hour.

The organic and aqueous phases of the mixture were then separated and the aqueous phase was dried and the product was recovered as a sodium salt of a sulfonated styrene/N-phenylmaleimide copolymer additive suitable for use as a mud-conditioning agent. The copolymer contained 8.2 weight percent sulfur based on total weight of the solids.

EXAMPLE V

This example demonstrates the preparation of a sulfonated styrene/maleic anhydride/N-phenylmaleimide terpolymer additive using the polymerization technique.

About 20 parts by weight of styrene monomer, about 12.6 parts by weight of maleic anhydride and about 18.5 parts by weight of N-phenylmaleimide monomer (prepared as in Eample IV) were dissolved in about 510 parts by weight of toluene.

The resulting solution was charged to a resin kettle and sparged with a stream of dry nitrogen for about 30 minutes.

Next about 3.2 parts of benzoyl peroxide (initiator) and 1.6 parts of mercaptoacetic acid (chain transfer agent) were added to the contents of the resin kettle.

The temperature of the contents of the resin kettle was increased to 75° C. and held there for about 1.6 hours.

The resulting terpolymer, a styrene/maleic anhydride/N-phenylmaleimide terpolymer, was recovered by filtration, tested and found to have a number average molecular weight of 4,400 as measured by GPC using polystyrene standards.

Next, a solution of about 20 parts by weight of the recovered terpolymer in 80 parts by weight dichloroethane was prepared.

The terpolymer-containing solution was then added to a solution of about 4.4 parts by weight $SO_3$ in 172 parts by weight dichloroethane at a rate which allowed moderate evolution of heat.

The resulting solution was heated to about 65° C., held at that temperature for about 1 hour and then cooled to about 45° C.

About 35 parts by weight of a 10 weight percent aqueous NaOH solution were added and the solution mixture reheated to about 65° C. and held for about about 1 hour.

The organic and aqueous phases of the mixture were then separated and the aqueous phase was dried and the product was recovered as a sodium salt of a sulfonated styrene/maleic anhydride/N-phenylmaleimide terpolymer additive suitable for use as a mud-conditioning agent. The terpolymer contained 5.0 weight percent sulfur based on total weight of the solid.

EXAMPLE VI

This example demonstrates the preparation of a sulfonated styrene/maleic anhydride/N-phenylmaleimide terpolymer additive using the polymerization technique.

About 40 parts by weight styrene monomer, about 7.5 parts by weight maleic anhydride and about 53.3 parts by weight N-phenylmaleimide (prepared as in Example IV) were dissolved in about 500 parts by weight toluene.

The resulting monomer solution was then charged to a reaction vessel fitted with a thermometer, a reflux condenser and a nitrogen purge.

The monomer solution was purged with nitrogen for about 25 minutes and followed by the addition of 5.8 parts by weight benzoyl peroxide and 2.9 parts by weight of mercaptoacetic acid.

Next, the reaction vessel was heated to initiate polymerization. And, after heating the solvent at reflux temperature (about 82° C.) for about 1 hour, the vessel was allowed to cool to room temperature.

The resulting terpolymer, a styrene/maleic anhydride/N-phenylmaleimide terpolymer, was recovered by filtration, tested and found to have a number average molecular weight of 6,700 as measured by GPC using polystyrene standards.

Elemental analysis of the terpolymer found, in wieght percent, 75.5 carbon, 5.4 hydrogen and 3.7 nitrogen.

The maleic anhydride content of the terpolymer was found by titration to be 7.3 weight percent.

The composition of the terpolymer was determined to be, in weight percent, 47.0 styrene units, 7.3 maleic anhydride units and 45.7 N-phenylmaleimide units.

Next, a solution of about 20 parts by weight of the recovered terpolymer in 80 parts by weight dichloroethane was prepared.

The terpolymer-containing solution was then added to a solution of about 9.8 parts by weight $SO_3$ in 357 parts by weight dichloroethane at a rate which allowed moderate evolution of heat.

The resulting solution was heated to about 65° C., held at that temperature for about 1 hour and then cooled to about 45° C.

About 78 parts by weight of a 10 weight percent aqueous NaOH solution were added and the solution mixture reheated to about 65° C. and held for about 1 hour.

The organic and aqueous phases of the mixture were then separated and the aqueous phase was dried and the product was recovered as a sodium salt of a sulfonated styrene/maleic anhydride/N-phenylmaleimide terpolymer additive suitable for use as a mud-conditioning agent. The terpolymer contained 8.6 weight percent sulfur based on total weight of the solids.

EXAMPLE VII

This example demonstrates the preparation of a sulfonated styrene/N-phenylmaleimide copolymer additive using the imidization technique.

About 40 grams of a styrene/maleic anhydride copolymer (SMA ® 1000) and 130 grams of nitrobenzene were charged to a reaction vessel equipped with a magnetic stirrer and Dean Stark trap.

The contents of the reaction vessel were purged thoroughly with dry nitrogen gas. The contents of the reaction vessel were heated to about 45° C. and about 20.4 grams of aniline was charged into the reaction vessel through an addition funnel over a period of about 2 minutes.

Within about 15 minutes after the completion of the aniline charge a large amount of precipitate had formed and dilution to 10 weight % solids was required to maintain agitation. And, as the temperature was increased to about 130° C. a homogenous reaction mixture was regained.

The reaction mixture was maintained at 130° C. for about 4½ hours and then allowed to cool to room temperature. Upon inspection no precipitate was observed.

Next, a 100 ml. aliquot of the reaction mixture was added to a 400 ml. aliquot of toluene to precipitate the polymer which was recovered by vacuum filtration and air dried at 100° C.

The resulting polymer, a styrene/N-phenylmaleimide copolymer, had a melting point of 230° C. The copolymer was subjected to elemental analysis and found to contain in weight percent 73.1 carbon, 5.5 hydrogen and 4.7 nitrogen. Polymer yield was 73%.

Next, a solution of about 20 parts by weight of the recovered terpolymer in 80 parts by weight dichloroethane was prepared.

The terpolymer-containing solution was then added to a solution of about 17.4 parts by weight $SO_3$ in 660 parts by weight nitrobenzene at a rate which allowed moderate evolution of heat.

The resulting solution was heated to about 65° C., held at that temperature for about 1 hour and then cooled to about 45° C.

About 125 parts by weight of a 10 weight percent aqueous NaOH solution were added and the solution mixture reheated to about 65° C. and held for about 1 hour.

The organic and aqueous phases of the mixture were then separated and the aqueous phase was dried and recovered as a sodium salt of a sulfonated styrene/maleic anhydride/N-phenylmaleimide terpolymer additive suitable for use as a mud-conditioning agent. The copolymer contained 13.0 weight percent sulfur based on total weight of the solids.

EXAMPLE VIII

This example demonstrates the ability of the additives to effectively control the rheology of a typical water-base drilling fluid at high temperature.

A water-base drilling fluid of the composition specified below was prepared.

| Component | Amount |
| --- | --- |
| water | 350 g. |
| bentonite | 15 g. |
| barite | 565 g. |
| Rev Dust* | 20 g. |
| Unical** | 4 g. |
| Drispac*** | 0.25 g. |
| NaOH | 1. g. |

*Powdered flyash
**Chromium modified lignosulfonate (thinner) Milchem Inc.
***Carboxymethyl cellulose (viscosifier) Drilling Specialities Co.

A control sample (Sample A) of the above water-base drilling fluid was charged to a high temperature, high pressure aging cell of the type manufactured by NL Baroid, division of NL Industries. The cell was pressurized to 250 psi with nitrogen. Three additional samples (Samples B, C and D) of the water-base drilling fluid were treated with 0.5, 1.5 and 3.0 gram quantities, respectively, of the sulfonated styrene/N-phenylmaleimide copolymer additive prepared in Example IV and each sample was charged to an aging cell of the type described above and pressurized to 250 psi with nitrogen.

The 2 gram quantities of additive charged corresponded directly to pounds per barrel (i.e. 0.5, 1.5, 3.0 g. per cell can also be read as pounds per 42 gallon barrel).

The four samples were aged at 150° F. for 16 hours in a Baroid roller oven. All four samples were then aged in the aging cells for an additional 16 hours at 375° F.

The water mud samples were removed from the cells at room temperature and the pH of each mud was adjusted to that typically observed for a field mud (about 10.5 to 11.5) with a 50 weight percent aqueous NaOH solution.

Next, the rheological properties of the muds were examined with a Model 35 Rheometer, manufactured by the Fann Instrument Division of Dresser Industries.

As shown in following Table I, the use of the sulfonated styrene/N-phenylmaleimide copolymer additive provided a dramatic improvement in the rheological properties of the drilling fluid.

TABLE I

| Sample | Plastic Viscosity (CP) | Yield Point (lb/1000 ft$^2$) | 10 Sec. Gel Strength (lb/1000 ft$^2$) | 10 Min. Gel Strength (lb/1000 ft$^2$) |
|---|---|---|---|---|
| A (Control) | 33 | 19 | 14 | 33 |
| B (0.5 PPB) | 31 | 2 | 1 | 2 |
| C (1.5 PPB) | 28 | 0 | 1 | 1 |
| D (3.0 PPB) | 28 | 0 | 1 | 1 |

EXAMPLE IX

This example demonstrates the effectiveness of the additives in the presence of the type of contamination typically encountered in the drilling process. Such contaminants include drill solids from the drilled strata and lime from drilling of "green" cement. Drill solids are normally "low yield" clays, e.g. clays which do not aggregate and develop significant gel strength. In this example, these low activity solids were simulated by the addition of Rev Dust, a powdered fly ash.

The water-base drilling fluid composition of Example VIII was modified by the addition of 20 grams of Rev Dust powdered fly ash to give 40 grams of Rev Dust per 350 ml. of water.

A sample of the untreated mud (Sample E) and three additional samples (Samples F, G and H) each separately treated, with 0.5, 1.5 and 3.0 gram quantities respectively, of the sulfonated styrene/N-phenylmaleimide copolymer additive of Example IV, were aged in aging cells pressurized to 250 psi with nitrogen at 150° F. for 16 hours in a Baroid roller oven. Then, the aging cells were cooled to room temperature, opened and each cell was contaminated by the addition of 0.62 grams of lime. This resulted in a calcium content of approximately 520 ppm in each sample. The samples were then aged in the aging cells for an additional 16 hours at 375° F.

The data presented in Table II illustrates the performance of the additives in the presence of soluble calcium.

The improved control of high temperature clay gellation is clearly illustrated.

TABLE II

| Sample | Plastic Viscosity (CP) | Yield Point (lb/1000 ft$^2$) | 10 Sec. Gel Strength (lb/1000 ft$^2$) | 10 Min. Gel Strength (lb/1000 ft$^2$) |
|---|---|---|---|---|
| E (Control) | 35 | 15 | 8 | 49 |
| F (0.5 PPB) | 36 | 7 | 2 | 22 |
| G (1.5 PPB) | 38 | 2 | 2 | 2 |
| H (3.0 PPB) | 38 | 0 | 3 | 2 |

EXAMPLE X

This example demonstrates the performance of the additives in saltcontaminated field muds.

A sample of a 16 pound per gallon water mud used to drill an offshore well in the Brazos 132A Block (Gulf of Mexico) was obtained. As received, the mud tested at a soluble chloride level of 2800 ppm.

Five test samples of this mud were prepared as follows:

A control sample (Sample I) was hot rolled at 400° F. for 16 hours.

A comparative sample (Sample J) was treated with 2 grams of Unical thinner, a chromium-modified lignosulfonate commercially available from Milchem Incorporated. Sample J was then hot rolled at 400° F. for 16 hours.

Another sample (Sample K) was treated with 2 grams of the styrene/N-phenylmaleimide copolymer additive of Example IV and hot rolled at 400° F. for 16 hours.

To further demonstrate the effectiveness of the additives of this invention in the presence of higher salt contamination two additional samples of the mud (Samples L and M) were further contaminated, respectively, with 1.67 and 4.22 grams of NaCl. Each sample was then treated with 2 grams of the styrene/N-phenylmaleimide copolymer additive of Example IV and hot rolled at 400° F. for 16 hours. Sample K was tested and found to contain a soluble chloride level of 4000 ppm. And, Sample L was found to contain a soluble chloride level of 6000 ppm.

The mud samples were recovered and tested as outlined in the previous examples. The data of Table III clearly illustrate the superior performance of the invention relative to chromium-modified lignosulfonates.

TABLE III

| Sample | Plastic Viscosity (CP) | Yield Point (lb/1000 ft$^2$) | 10 Sec. Gel Strength (lb/1000 ft$^2$) | 10 Min. Gel Strength (lb/1000 ft$^2$) |
|---|---|---|---|---|
| 1 (Control) | 33 | 140 | 100 | 107 |
| 2 (Comparative) | 45 | 81 | 53 | 68 |
| 3 (2.0 PPB) | 42 | 1 | 2 | 7 |
| 4 (2.0 PPB) | 43 | 4 | 2 | 8 |
| 5 (2.0 PPB) | 47 | 16 | 3 | 30 |

It will be evident from the foregoing that various modifications can be made to this invention. Such, however, are considered to be within the scope of this invention.

What is claimed is:

1. A dispersant for water-based drilling fluids comprising a sulfonated copolymer containing from about 25 to about 75 mole percent recurring units of a maleimide monomer and from about 75 to about 25 mole percent recurring units of a vinyl monomer, wherein the maleimide monomer has the formula:

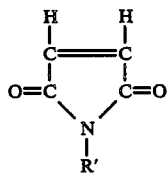

wherein R' represents an aromatic group wherein the vinyl monomer has the formula:

wherein $R^2$ represents an aromatic group, or an alkyl substituted aromatic group, wherein the copolymer has a number average molecular weight within the range of from about 1,000 to about 50,000, and wherein both the maleimide and the vinyl monomers of the copolymer are sulfonated subsequent to the polymerization reaction between the maleimide monomer and the vinyl monomer by reacting the resulting copolymer with a sulfonating agent.

2. The dispersant of claim 1, wherein the sulfonated groups on the copolymer are present in neutralized form as alkali metal salts.

* * * * *